United States Patent
Matsumoto et al.

(10) Patent No.: US 10,513,351 B2
(45) Date of Patent: Dec. 24, 2019

(54) PASSENGER BOARDING BRIDGE

(71) Applicant: SHINMAYWA INDUSTRIES, LTD., Takarazuka-shi, Hyogo (JP)

(72) Inventors: Kenji Matsumoto, Takarazuka (JP); So Hirohata, Takarazuka (JP); Shoichi Kawabata, Takarazuka (JP); Takahiro Yoshimoto, Takarazuka (JP)

(73) Assignee: SHINMAYWA INDUSTRIES, LTD., Takarazuka-Shi, Hyogo (JP)

( * ) Notice: Subject to any disclaimer, the term of this patent is extended or adjusted under 35 U.S.C. 154(b) by 0 days.

(21) Appl. No.: 16/328,859

(22) PCT Filed: May 17, 2017

(86) PCT No.: PCT/JP2017/018574
§ 371 (c)(1),
(2) Date: Feb. 27, 2019

(87) PCT Pub. No.: WO2018/211641
PCT Pub. Date: Nov. 22, 2018

(65) Prior Publication Data
US 2019/0185183 A1   Jun. 20, 2019

(51) Int. Cl.
*B64F 1/305* (2006.01)
*E01D 15/12* (2006.01)

(52) U.S. Cl.
CPC ............ *B64F 1/305* (2013.01); *E01D 15/124* (2013.01)

(58) Field of Classification Search
CPC .............................. B64F 1/305; E01D 15/124
USPC .................................................. 14/71.1–72.5
See application file for complete search history.

(56) References Cited

U.S. PATENT DOCUMENTS

| | | | | |
|---|---|---|---|---|
| 8,302,237 | B2 * | 11/2012 | Shimizu | B64F 1/3055 14/69.5 |
| 9,090,359 | B2 * | 7/2015 | Wada | E01D 15/10 |
| 2009/0223005 | A1 * | 9/2009 | Motohashi | B64F 1/31 14/72.5 |
| 2015/0082558 | A1 * | 3/2015 | Wada | B64F 1/305 14/71.1 |

(Continued)

FOREIGN PATENT DOCUMENTS

CN        102381484 A       3/2012

*Primary Examiner* — Raymond W Addie
(74) *Attorney, Agent, or Firm* — Alleman Hall Creasman & Tuttle LLP

(57) ABSTRACT

A passenger boarding bridge comprises: a walkway section which is provided at an outer tunnel of adjacent tunnels, and is movable between a walkway position and a non-walkway position located under the walkway position; and a plurality of rotary members arranged along the lengthwise direction of the outer tunnel, each of the plurality of rotary members being rotatable around a vertical rotation axis between a first rotation position at which the rotary member supports an end portion of the walkway section while at the walkway position and a second rotation position at which the rotary member does not support the end portion. In a case where at least one of adjacent rotary members of the plurality of rotary members is at the second rotation position, the adjacent rotary members partially overlap with each other when viewed in the width direction of the walkway section or in the vertical direction.

5 Claims, 12 Drawing Sheets

(56) References Cited

U.S. PATENT DOCUMENTS

2016/0264261 A1\* 9/2016 Kim ........................ E01D 15/10
2019/0063058 A1\* 2/2019 Malkowski ......... E04B 1/34305

\* cited by examiner

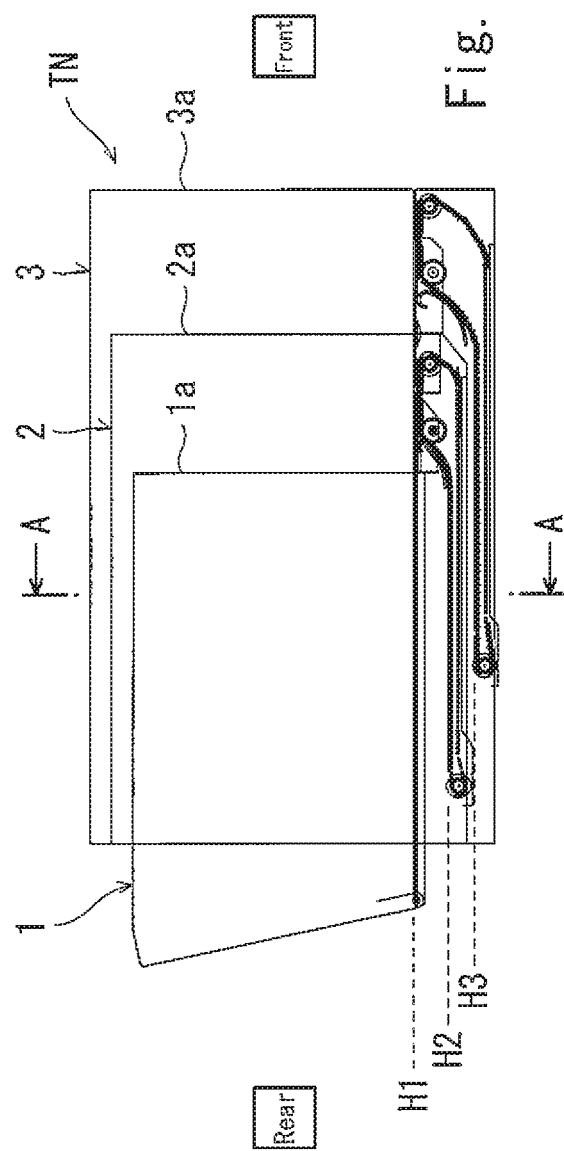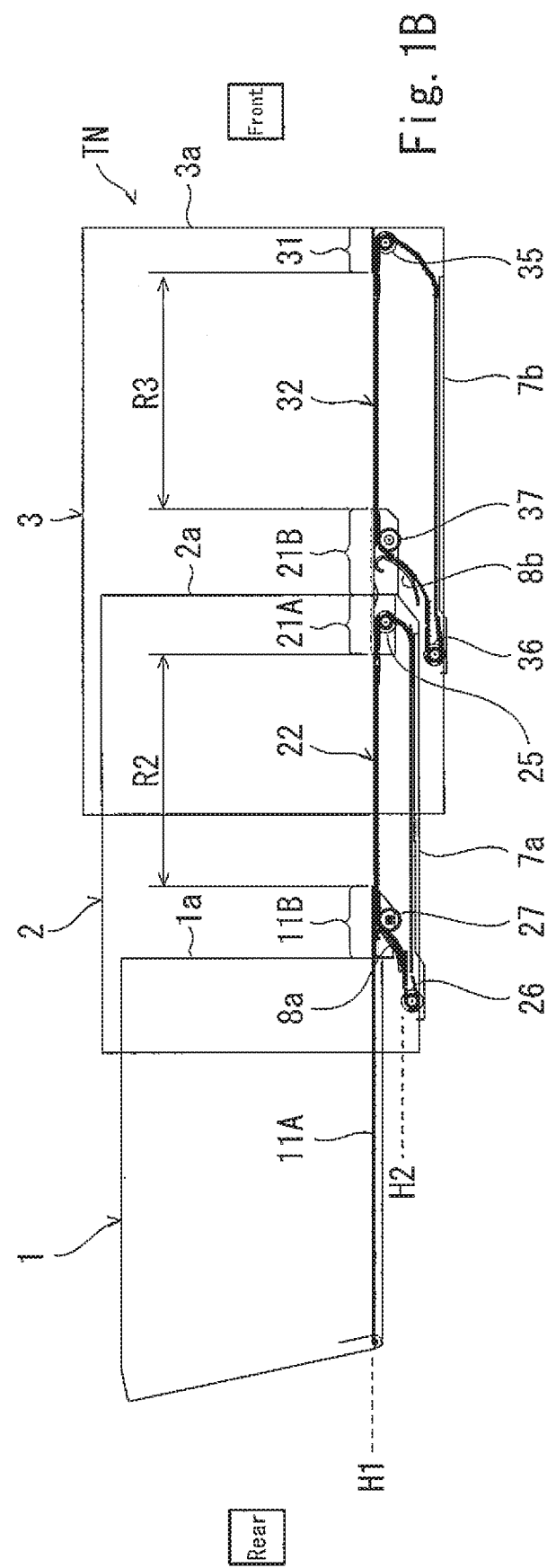

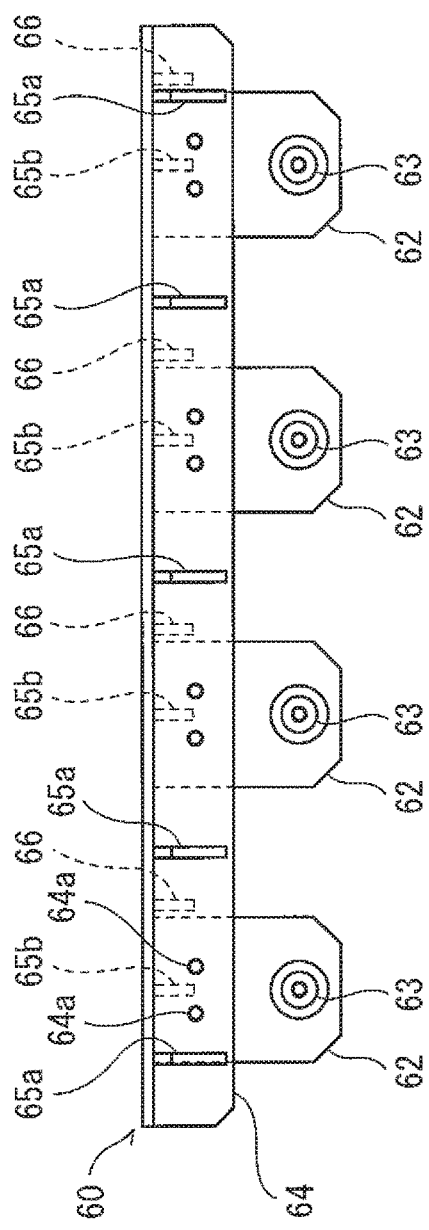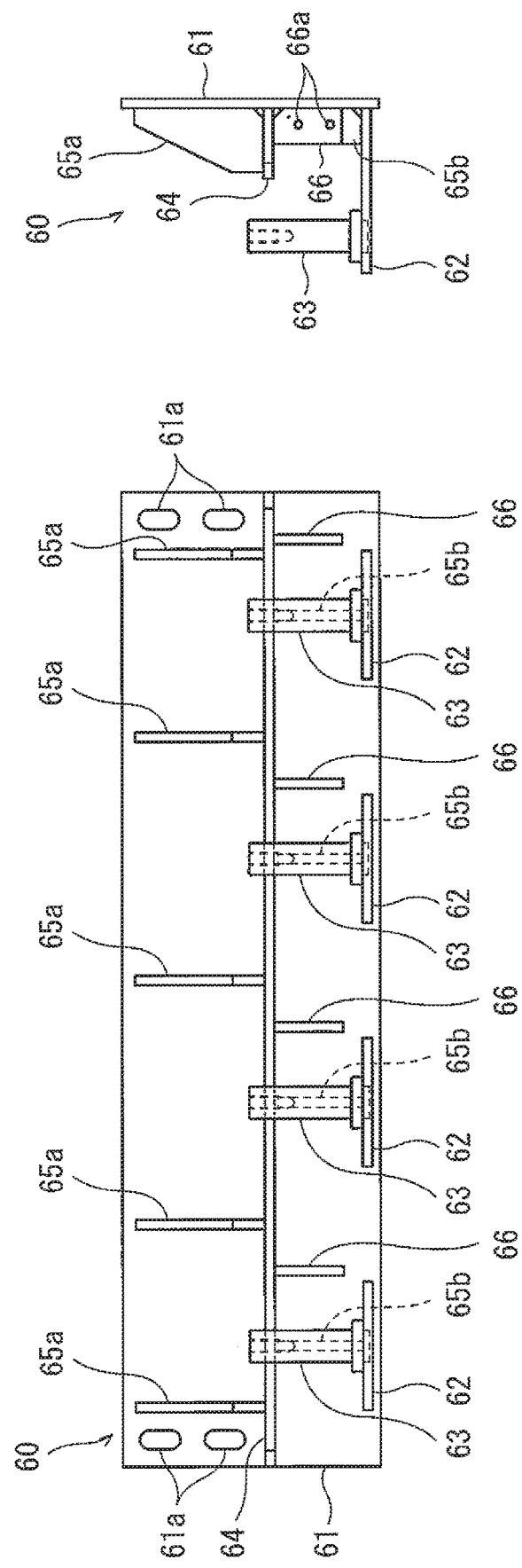
Fig. 7A
Fig. 7B
Fig. 7C

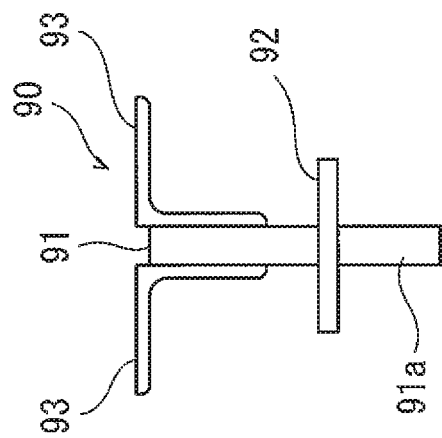
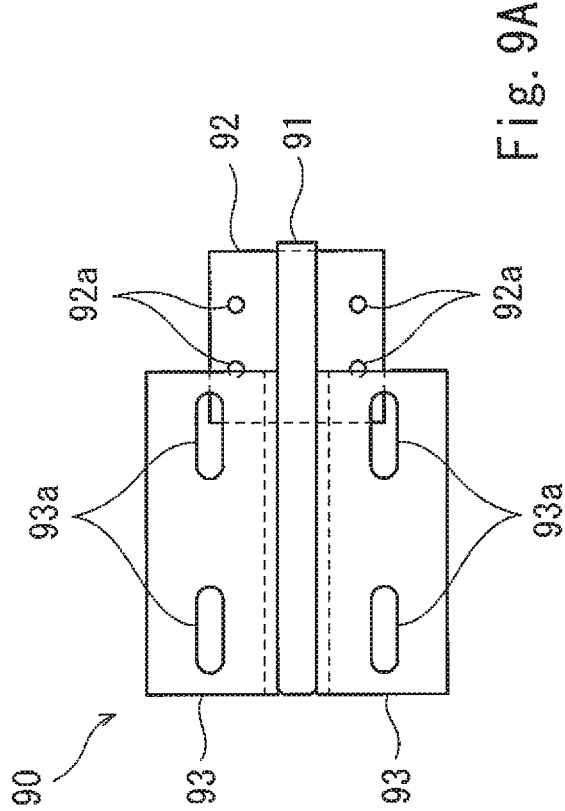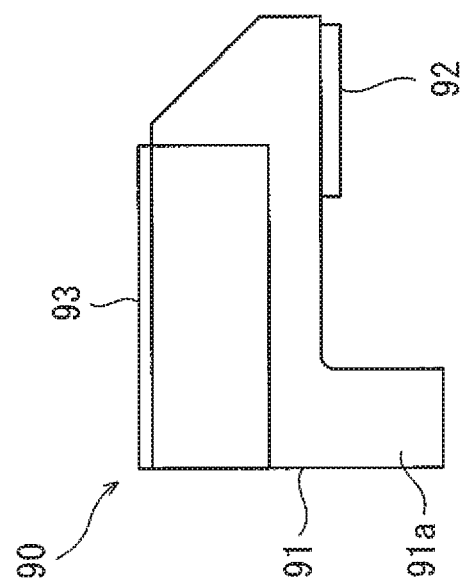

PASSENGER BOARDING BRIDGE

TECHNICAL FIELD

The present invention relates to a passenger boarding bridge.

BACKGROUND ART

In a case where passengers get into and off an aircraft (airplane) in an airport, a passenger boarding bridge coupling a terminal building to the aircraft is sometimes used.

The passenger boarding bridge includes a rotunda connected to a platform of the terminal building, a tunnel section having a base end connected to the rotunda and being extendable and retractable, and a cab (head) provided at the tip end of the tunnel section and connected to the aircraft.

The tunnel section includes a plurality of tunnels which are telescopically fitted to each other. The tunnel section is extendable and retractable over the entire length in a lengthwise or longitudinal direction. With this configuration, a change in a distance between the terminal building and the aircraft can be properly dealt with. In this case, floors of the tunnels form a walkway for the passengers between the platform of the terminal building and an entrance of the aircraft in the airport.

Adjacent tunnels with an outer-inner-tunnel relation are telescopically fitted to each other. In this structure, a stepped portion is formed in the walkway constituted by these tunnels. This impedes smooth walk of the passengers (travelers). Under the circumstances, a stepless structure of the walkway for eliminating the stepped portion has been proposed.

For example, Patent Literature 1 discloses a configuration in which the outer tunnel of the adjacent tunnels includes a walkway section comprised of a plurality of floor plates coupled to each other, and this walkway section is moved to the underside of the floor of the inner tunnel. Patent Literature 1 discloses in FIGS. 14 to 16 a configuration in which a plurality of extension/retraction support shafts (indicated by reference symbol "3" in the drawings) which are rotatable to support a walkway section, are arranged in the lengthwise direction (longitudinal direction) of the outer tunnel, at a location that is inward of the outer tunnel.

CITATION LIST

Patent Literature

Patent Literature 1: Chinese Patent Application Publication No. 102381484 specification

SUMMARY OF INVENTION

Technical Problem

Regarding the above-described configuration disclosed in Patent Literature 1, a gap between adjacent extension/retraction support shafts is large, and therefore the floor plates constituting (forming) the walkway section cannot be stably supported. In Patent Literature 1, consideration is not given to occurrence of a change in a fitting clearance between the inner tunnel and the outer tunnel in a case where the tunnel section is extended and retracted.

The present invention has been developed to solve the above-described problem, and an object of the present invention is to provide a passenger boarding bridge which has a stepless structure and allows the walkway section of the outer tunnel to be stably supported. Another object of the present invention is to provide a passenger boarding bridge which can smoothly support the walkway section and smoothly cease to support the walkway section even in a case where a change in the fitting clearance between the inner tunnel and the outer tunnel occurs in a case where the tunnel section is extended and retracted.

Solution to Problem

To achieve the above-described object, according to an aspect of the present invention, there is provided a passenger boarding bridge including a tunnel section including a plurality of tunnels which are telescopically fitted to each other and are movable relative to each other in a lengthwise direction so that the tunnel section is extendable and retractable, the passenger boarding bridge comprising: a walkway section which is provided at an outer tunnel of adjacent tunnels, and is movable between a walkway position set at a predetermined height position and a non-walkway position located under the walkway position; and a plurality of rotary members arranged along the lengthwise direction of the outer tunnel, each of the plurality of rotary members being rotatable around a rotation axis line extending in a vertical direction, and each of the plurality of rotary members being configured to be rotated between a first rotation position at which the rotary member supports an end portion of the walkway section in a width direction so that the walkway section is at the walkway position and a second rotation position at which the rotary member is away from the end portion of the walkway section in the width direction and does not support the end portion of the walkway section in the width direction, wherein in a case where at least one of adjacent rotary members of the plurality of rotary members is at the second rotation position, the adjacent rotary members partially overlap with each other when viewed in the width direction of the walkway section or in the vertical direction.

In accordance with this configuration, in a case where at least one of adjacent rotary members is at the second rotation position at which the rotary member does not support the walkway section of the outer tunnel, the adjacent rotary members partially overlap with each other when viewed in the width direction of the walkway section or in the vertical direction. Therefore, the arrangement pitch of the rotary members can be reduced, and the walkway section at the walkway position can be stably supported.

The passenger boarding bridge may further comprise: a positioning and retaining member which is engageable with a first engaged portion provided at each of the plurality of rotary members to position and retain the rotary member at the first rotation position, the positioning and retaining member being engageable with a second engaged portion provided at each of the plurality of rotary members to position and retain the rotary member at the second rotation position.

In accordance with this configuration, the positioning and retaining member can easily position and retain the rotary member at the predetermined first or second rotation position. Since a friction is generated between the rotary member and the positioning and retaining member only during the rotation of the rotary member, abrasion of the rotary member and the positioning and retaining member can be reduced.

The passenger boarding bridge may further comprise a guide section provided on the rotation axis line to correspond to each of the plurality of rotary members; and a rotation operation member protruding from a front end of an inner tunnel of the adjacent tunnels, the rotation operation member including: a contact portion which contacts the plurality of rotary members in turn to rotate the rotary members in a case where the tunnel section is extended and retracted, and a passage channel extending in the lengthwise direction of the inner tunnel, the guide section being configured to move through the passage channel when each of the plurality of rotary members is rotated, and the rotation operation member may be slidable within a predetermined range in the width direction of the walkway section, with respect to the inner tunnel.

In accordance with this configuration, in a case where the contact portion of the rotation operation member contacts the rotary member and the rotary member is rotated, the guide section provided on the rotation axis line of this rotary member moves through the passage channel of the rotation operation member. The rotation operation member is slidable within the predetermined range in the width direction of the walkway section, with respect to the inner tunnel. In a case where the tunnel section is extended and retracted, the rotary member can be properly rotated according to the extension/retraction of the tunnel section, while absorbing a position error in the width direction of the walkway section between the contact portion and each of the rotary members, which occurs due to the fitting clearance formed between the inner tunnel and the outer tunnel. Therefore, even when a change occurs in the fitting clearance between the inner tunnel and the outer tunnel, in a case where the tunnel section is extended and retracted, the rotary member can smoothly support the walkway section and smoothly cease to support the walkway section.

In a case where the tunnel section is retracted, the walkway section at the walkway position may be moved to an underside of the inner tunnel, and placed at the non-walkway position, and the rotary member corresponding to the end portion of the walkway section in the width direction may be rotated from the first rotation position to the second rotation position when the walkway section is changed from the walkway position to the non-walkway position, and in a case where the tunnel section is extended, the walkway section at the non-walkway position may be moved up from the underside of the inner tunnel, and placed at the walkway position, and the rotary member corresponding to the end portion of the walkway section in the width direction may be rotated from the second rotation position to the first rotation position when the walkway section is changed from the non-walkway position to the walkway position.

According to another aspect of the present invention, there is provided a passenger boarding bridge including a tunnel section including a plurality of tunnels which are telescopically fitted to each other and are movable relative to each other in a lengthwise direction so that the tunnel section is extendable and retractable, the passenger boarding bridge comprising: a walkway section which is provided at an outer tunnel of adjacent tunnels, and is movable between a walkway position set at a predetermined height position and a non-walkway position located under the walkway position; a plurality of rotary members arranged along a lengthwise direction of the outer tunnel, each of the plurality of rotary members being rotatable around a rotation axis line extending in a vertical direction, and each of the plurality of rotary members being configured to be rotated between a first rotation position at which the rotary member supports an end portion of the walkway section in a width direction so that the walkway section is at the walkway position and a second rotation position at which the rotary member is away from the end portion of the walkway section in the width direction and does not support the end portion of the walkway section in the width direction; a guide section provided on the rotation axis line to correspond to each of the plurality of rotary members; and a rotation operation member protruding from a front end of an inner tunnel of the adjacent tunnels, the rotation operation member including: a contact portion which contacts the plurality of rotary members in turn to rotate the rotary members in a case where the tunnel section is extended and retracted, and a passage channel extending in the lengthwise direction of the inner tunnel, the guide section being configured to move through the passage channel when each of the plurality of rotary members is rotated, wherein the rotation operation member is slidable within a predetermined range in a width direction of the walkway surface, with respect to the inner tunnel.

In accordance with this configuration, in a case where the contact portion of the rotation operation member contacts the rotary member and the rotary member is rotated, the guide section provided on the rotation axis line of this rotary member moves through the passage channel of the rotation operation member. The rotation operation member is slidable within the predetermined range in the width direction of the walkway section, with respect to the inner tunnel. In a case where the tunnel section is extended and retracted, the rotary member can be properly rotated according to the extension/retraction of the tunnel section, while absorbing a position error in the width direction of the walkway section between the contact portion and each of the rotary members, which occurs due to the fitting clearance formed between the inner tunnel and the outer tunnel. Therefore, even when a change occurs in the fitting clearance between the inner tunnel and the outer tunnel, in a case where the tunnel section is extended and retracted, the rotary member can smoothly support the walkway section and smoothly cease to support the walkway section.

Advantageous Effects of Invention

The present invention has the above-described configuration, and can obtain an advantage in that it is possible to provide a passenger boarding bridge which has a stepless structure and allows a walkway section of an outer tunnel to be stably supported. Also, the present invention can obtain an advantage in that it is possible to provide a passenger boarding bridge which can smoothly support the walkway section and smoothly cease to support the walkway section even in a case where a change in a fitting clearance between an inner tunnel and an outer tunnel occurs in a case where a tunnel section is extended and retracted.

The above and further objects, features and advantages of the present invention will more fully be apparent from the following detailed description with accompanying drawings.

BRIEF DESCRIPTION OF DRAWINGS

FIGS. 1(A) and 1(B) are views showing an example of a tunnel section of a passenger boarding bridge according to an embodiment.

FIGS. 7(A), 7(B), and 7(C) are a plan view, a front view, and a side view, respectively, of a bracket.

FIGS. 9(A), 9(B), and 9(C) are a plan view of a contact member, a side view of the contact member when viewed from one side, and a side view of the contact member when viewed from the other side (opposite side).

DESCRIPTION OF EMBODIMENTS

Figure 2:
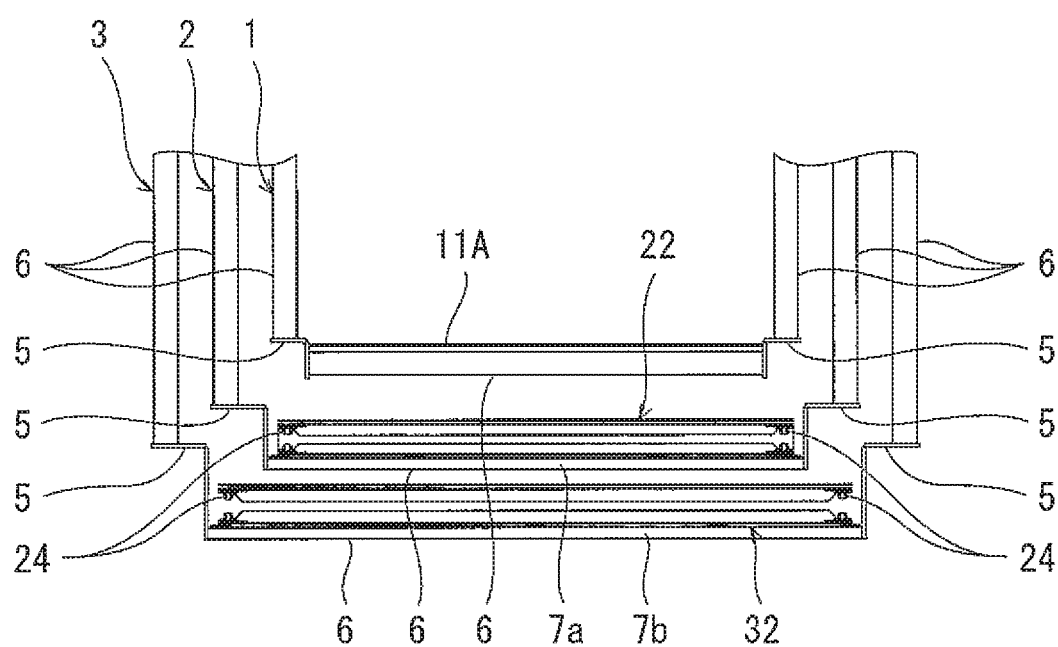
FIG. 2 is a cross-sectional view taken along line A-A of FIG. 1(A).

Hereinafter, the preferred embodiment of the present invention will be described with reference to the drawings. In the description below, throughout the drawings, the same or corresponding constituents are designated by the same reference symbols and repeated description thereof is omitted. In the drawings, the constituents are omitted in some cases for easier illustration. The present invention is not limited to the embodiment described below.

Embodiment

FIGS. 1(A) and 1(B) are views showing an example of a tunnel section of a passenger boarding bridge according to the embodiment. FIG. 1(A) is a schematic perspective view showing a state in which the tunnel section is most retracted, when viewed from a side. FIG. 1(B) is a schematic perspective view showing a state in which the tunnel section is most extended, when viewed from a side. FIG. 2 is a cross-sectional view taken along line A-A of FIG. 1(A).

Hereinafter, a direction in which a tunnel section TN of the passenger boarding bridge is extendable and retractable over an entire length will be referred to as "front-rear direction" and a direction in which a gravitational force works on the passenger boarding bridge will be referred to as "up-down direction (vertical direction)". Also, a walkway width direction or a width direction which will be described later corresponds to a direction perpendicular to the front-rear direction and the up-down direction. Further, as shown in FIG. 1, in the passenger boarding bridge, a side which is closer to an aircraft will be referred to as "front" and a side which is closer to a terminal building will be referred to as "rear".

The passenger boarding bridge according to the present embodiment includes the tunnel section TN comprised of a plurality of tunnels 1 to 3 with a tubular shape which are telescopically fitted to each other and are movable relative to each other in the front-rear direction so that the tunnel section TN is extendable and retractable. The tunnel section TN constitutes a walkway on which passengers can walk. As defined herein, the front-rear direction of the tunnel section TN conforms to the lengthwise (longitudinal) direction of the tunnel section TN and the tunnels 1 to 3.

In addition to the tunnel section TN, the passenger boarding bridge includes a rotunda (rear circular room), a cab (front circular room), and a drive column, which are not shown in the drawings. The rotunda is connected to a platform of the terminal building. The rotunda is supported so that it is rotatable around an axis extending in the up-down direction (vertical direction). The rotunda is connected to the rear end portion of the tunnel section TN. The cab is connected to the front end of the tunnel section TN (front end of the tunnel 3 in the present example), and rotatably provided. The drive column is coupled to, for example, a suitable location which is a front location of the tunnel section TN (specifically, a suitable location of the foremost tunnel 3) to support the tunnel section N.

When a drive wheel at the lower end of the drive column travels in the front-rear direction on an apron, a driving force for extension/retraction movement in the front-rear direction is transferred to the tunnel section TN. When the tunnel section TN is extended to its maximum length, and the cab disposed at the front end of the tunnel section TN reaches the entrance of the aircraft, a walkway on which the passengers can walk is formed between the platform of the terminal building and the entrance of the aircraft in the airport. The drive column is extendable and retractable in the up-down direction (in the vertical direction). By the extension/retraction movement in the up-down direction, of the drive column, the tunnel section TN can perform a pivot (swing) movement in the up-down direction, with respect to the rotunda which is located in the vicinity of the platform of the terminal building. An operation board (not shown) is disposed inside the cab. By manipulating this operation board, an operator can operate devices (e.g., drive column or the like) of the passenger boarding bridge.

The tunnel section TN of the present embodiment has a stepless structure in which the stepped portion of the walkway section is eliminated. The tunnel section TN which is the feature of the present embodiment will be described in detail. Hereinafter, the tunnels 1, 2, and 3 will be referred to as a first tunnel 1, a second tunnel 2, and a third tunnel 3, respectively.

Each of the first to third tunnels 1 to 3 has a substantially quadrangular prism shape and a hollow space. Beams 5 (FIG. 2) made of steel are provided at the sides of each of quadrangular prisms. To couple the beams 5, for example, iron-made panels 6 (FIG. 2) are mounted on side surfaces and upper and lower surfaces of the quadrangular prisms. In this way, tubular members 1a, 2a, 3a (FIG. 1) are constructed.

The first tunnel 1 includes fixed walkway sections 11A, 11B comprised of floor members secured to the members (beams 5, or the like) of the first tunnel 1 so that the passengers can walk on the fixed walkway sections 11A, 11B.

The second tunnel 2 includes fixed walkway sections 21A, 21B and a movable walkway section 22 on which the passengers can walk. The fixed walkway sections 21A, 21B are constituted by floor members secured to the members of the second tunnel 2, at the front portion of the second tunnel 2. For example, as shown in FIG. 5(B) and the like, the movable walkway section 22 is constructed so that a plurality of floor members 23 are coupled to each other by a pair of endless chains 24 disposed to be spaced apart from each other in the walkway width direction (width direction of the movable walkway section 22). First to third sprockets 25 to 27 are provided to correspond to each of the chains 24. Each of the chains 24 is engaged with the corresponding first to third sprockets 25 to 27. Thus, each of the chains 24 is movable along a circular path on a virtual vertical plane parallel to the front-rear direction. The first sprockets 25 and the second sprockets 26 are mounted on the second tunnel 2. The third sprockets 27 are mounted on the first tunnel 1.

Figure 3A:
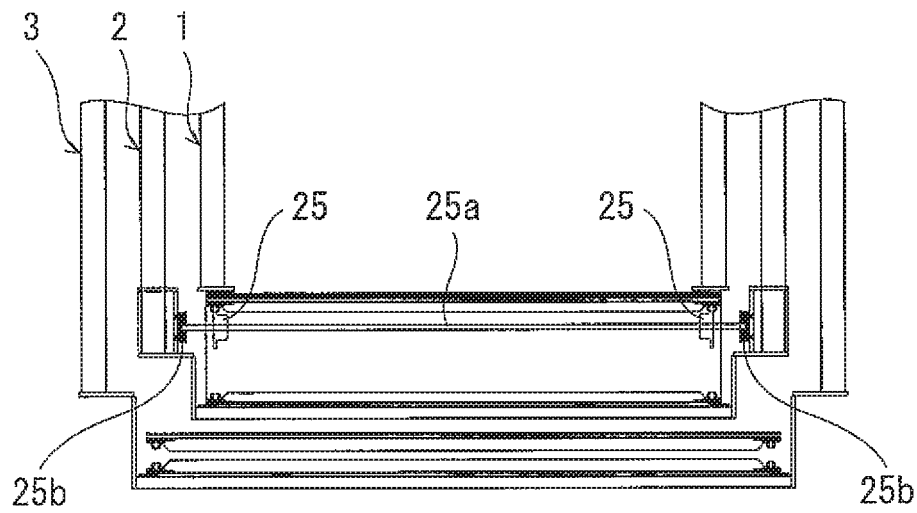
FIGS. 3(A), 3(B), and 3(C) are schematic cross-sectional views of a tunnel section, showing examples of layout of first, second, and third sprockets of a movable walkway section of a second tunnel.
Figure 3B:
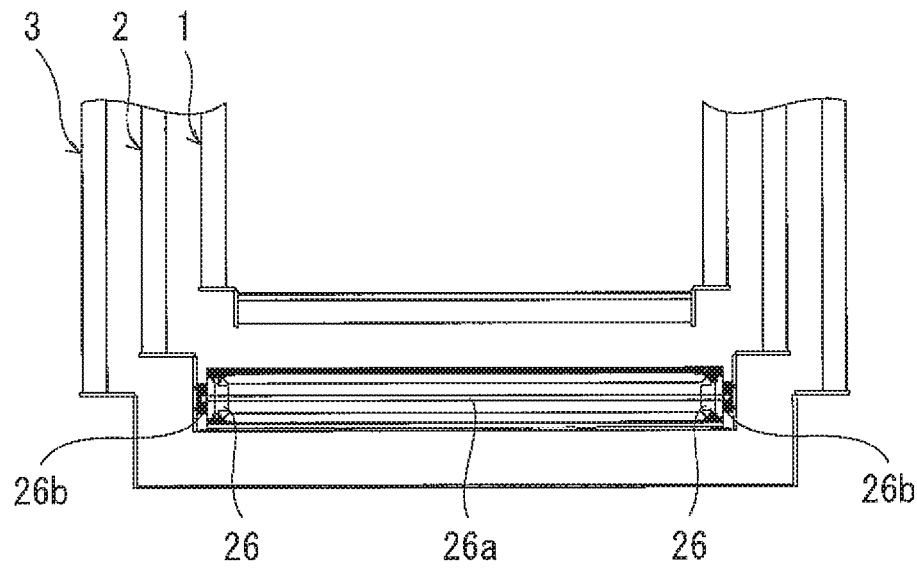
Figure 3C:
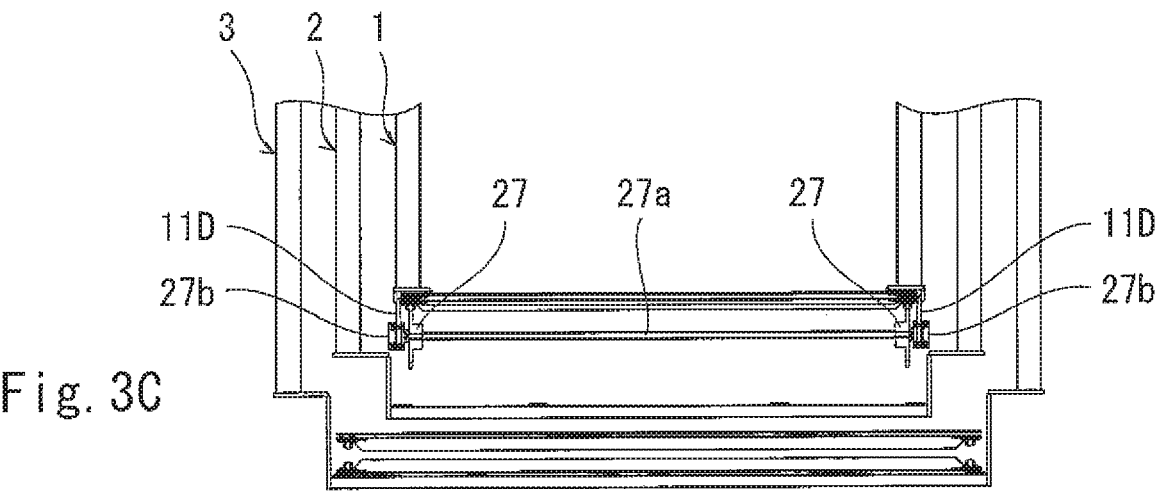

FIGS. 3(A), 3(B), and 3(C) are schematic cross-sectional views of the tunnel section, showing the examples of layout of the first sprockets 25, the example of layout of the second sprockets 26, and the example of layout of the third sprockets 27.

The first sprockets 25 are rotatably mounted at front locations of the second tunnel 2. Specifically, as shown in FIG. 3(A), the pair of first sprockets 25 are secured to one coupling shaft 25a. The both ends of the coupling shaft 25a are supported by bearings 25b, respectively, so that the coupling shaft 25a is rotatable. The two bearings 25b are secured to the second tunnel 2.

The second sprockets 26 are rotatably mounted at rear locations of the second tunnel 2, and under (below) the first tunnel 1. Specifically, as shown in FIG. 3(B), the pair of second sprockets 26 are secured to one coupling shaft 26a. The both ends of the coupling shaft 26a are supported by bearings 26b, respectively, so that the coupling shaft 26a is rotatable. The two bearings 26b are secured to the second tunnel 2.

The third sprockets 27 are rotatably mounted at suitable locations of the front end of the first tunnel 1 and protrude into the second tunnel 2. Specifically, as shown in FIG. 3(C), the pair of third sprockets 27 are secured to one coupling shaft 27a. The both ends of the coupling shaft 27a are supported by bearings 27b, respectively, so that the coupling shaft 27a is rotatable. The two bearings 27b are secured to the tip end portion of a plate member 11D protruding to the front from the tubular member 1a of the first tunnel 1.

The third tunnel 3 includes a fixed walkway section 31 and a movable walkway section 32 on which the passengers can walk. The fixed walkway section 31 is constituted by floor members secured to the members of the third tunnel 3, at a front portion of the third tunnel 3. The constituents of the movable walkway section 32 have basically the same configuration as that of the constituents of the movable walkway section 22 described above, except a dimension or the like. The movable walkway section 32 is constructed so that the plurality of floor members 23 are coupled to each other by the pair of endless chains 24 disposed to be spaced apart from each other in the walkway width direction. First to third sprockets 35 to 37 are provided to correspond to each of the chains 24. Each of the chains 24 is engaged with the corresponding first to third sprockets 35 to 37. Thus, each of the chains 24 is movable along the circular path on the virtual vertical plane parallel to the front-rear direction. The first sprockets 35 and the second sprockets 36 are mounted on the third tunnel 3. The third sprockets 37 are mounted on the second tunnel 2.

Figure 4A:
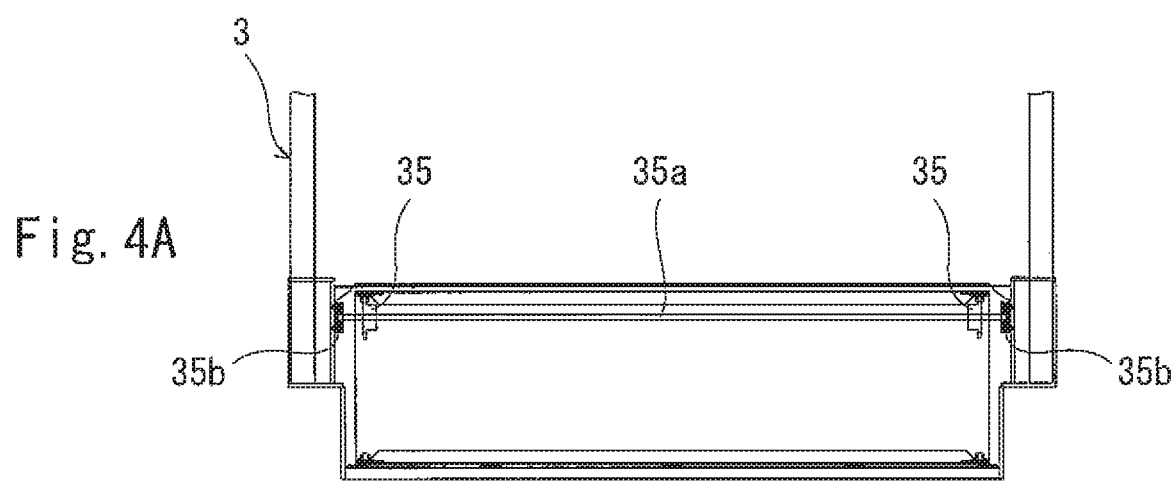
FIGS. 4(A), 4(B), and 4(C) are schematic cross-sectional views of the tunnel section, showing examples of layout of first, second, and third sprockets of a movable walkway section of a third tunnel.
Figure 4B:
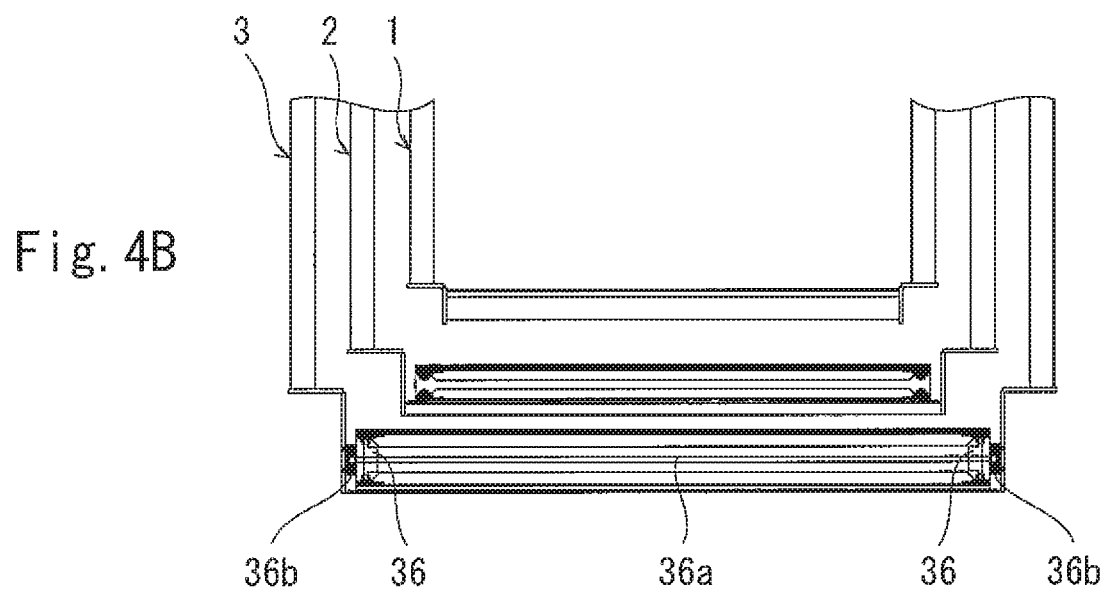
Figure 4C:
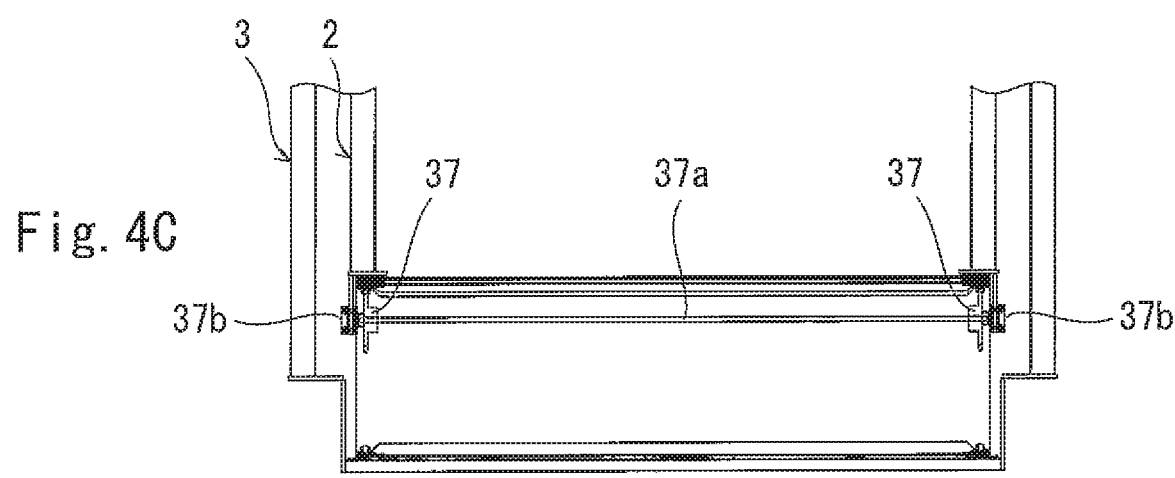

FIGS. 4(A), 4(B), and 4(C) are schematic cross-sectional views of the tunnel section, showing the example of layout of the first sprockets 35, the example of layout of the second sprockets 36, and the example of layout of the third sprockets 37.

The first sprockets 35 are rotatably mounted at front locations of the third tunnel 3. Specifically, as shown in FIG. 4(A), the pair of first sprockets 35 are secured to one coupling shaft 35a. The both ends of the coupling shaft 35a are supported by bearings 35b, respectively, so that the coupling shaft 35a is rotatable. The two bearings 35b are secured to the third tunnel 3.

The second sprockets 36 are rotatably mounted at rear locations of the third tunnel 3, and under (below) the second tunnel 2. Specifically, as shown in FIG. 4(B), the pair of second sprockets 36 are secured to one coupling shaft 36a. The both ends of the coupling shaft 36a are supported by bearings 36b, respectively, so that the coupling shaft 36a is rotatable. The two bearings 36b are secured to the third tunnel 3.

The third sprockets 37 are rotatably mounted at suitable locations of the front end of the second tunnel 2 and protrude into the third tunnel 3. Specifically, as shown in FIG. 4(C), the pair of third sprockets 37 are secured to one coupling shaft 37a. The both ends of the coupling shaft 37a are supported by bearings 37b, respectively, so that the coupling shaft 37a is rotatable. The two bearings 37b are secured to a suitable member protruding to the front from the tubular member 2a of the second tunnel 2.

The first tunnel 1 includes the fixed walkway section 11A provided at the tubular member 1a, in the entire region from the rear end portion of the tubular member 1a to the front end portion of the tubular member 1a, and the fixed walkway section 11B protruding to the front from the front end of the tubular member 1a. The second tunnel 2 includes the fixed walkway section 21A provided at a front portion (portion which is near the front end portion) inside the tubular member 2a, and the fixed walkway section 21B protruding to the front from the front end of the tubular member 2a. The third tunnel 3 includes the fixed walkway section 31 at a front portion (portion which is near the front end portion) inside the tubular member 3a.

The fixed walkway sections 11A, 11B, 21A, 21B, 31 are provided so that the heights (vertical levels) of walkway surfaces (obverse surfaces) thereof are substantially equal to each other. The movable walkway sections 22, 32 are provided so that heights (vertical levels) of walkway surfaces thereof are substantially equal to those of the fixed walkway sections 11A, 11B, 21A, 21B, 31. In brief, the movable walkway sections 22, 32 and the fixed walkway sections 11A, 11B, 21A, 21B, 31 are provided so that the walkway surfaces thereof are at a predetermined equal height position (walkway position H1). As can be seen from a comparison between FIGS. 1(A) and 1(B), the movable walkway section 22 is movable between the walkway position H1 and a non-walkway position H2 which is located under the walkway position H1, and the movable walkway section 32 is movable between the walkway position H1 and a non-walkway position H3 which is located under the walkway position H1.

For example, iron-made plates 7a, 7b are disposed at the bottom portions of the tubular members 2a, 3a of the second and third tunnels 2, 3, respectively. The lower portions of the movable walkway sections 22, 32 are placed on the iron-made plates 7a, 7b, respectively. A guide plate 8a with a curved shape is mounted on the front end portion of the first tunnel 1 to guide the movable walkway section 22 of the second tunnel 2 to a region that is under the tubular member 1a of the first tunnel 1 while avoiding a contact between the movable walkway section 22 and the tubular member 1a. Likewise, a guide plate 8b with a curved shape is mounted on the front end portion of the second tunnel 2 to guide the movable walkway section 32 of the third tunnel 3 to a region that is under the tubular member 2a of the second tunnel 2 while avoiding a contact between the movable walkway section 32 and the tubular member 2a.

Next, the detail of the movable walkway sections 22, 32 will be described with reference to FIGS. 5 to 10 and the like. The two movable walkway sections 22, 32 have basically the same configuration and constituents supporting the movable walkway sections 22, 32 have the same configuration. Therefore, hereinafter, the movable walkway section 22 of the second tunnel 2 and the constituents supporting the movable walkway section 22 will be described in detail.

Figure 5A:
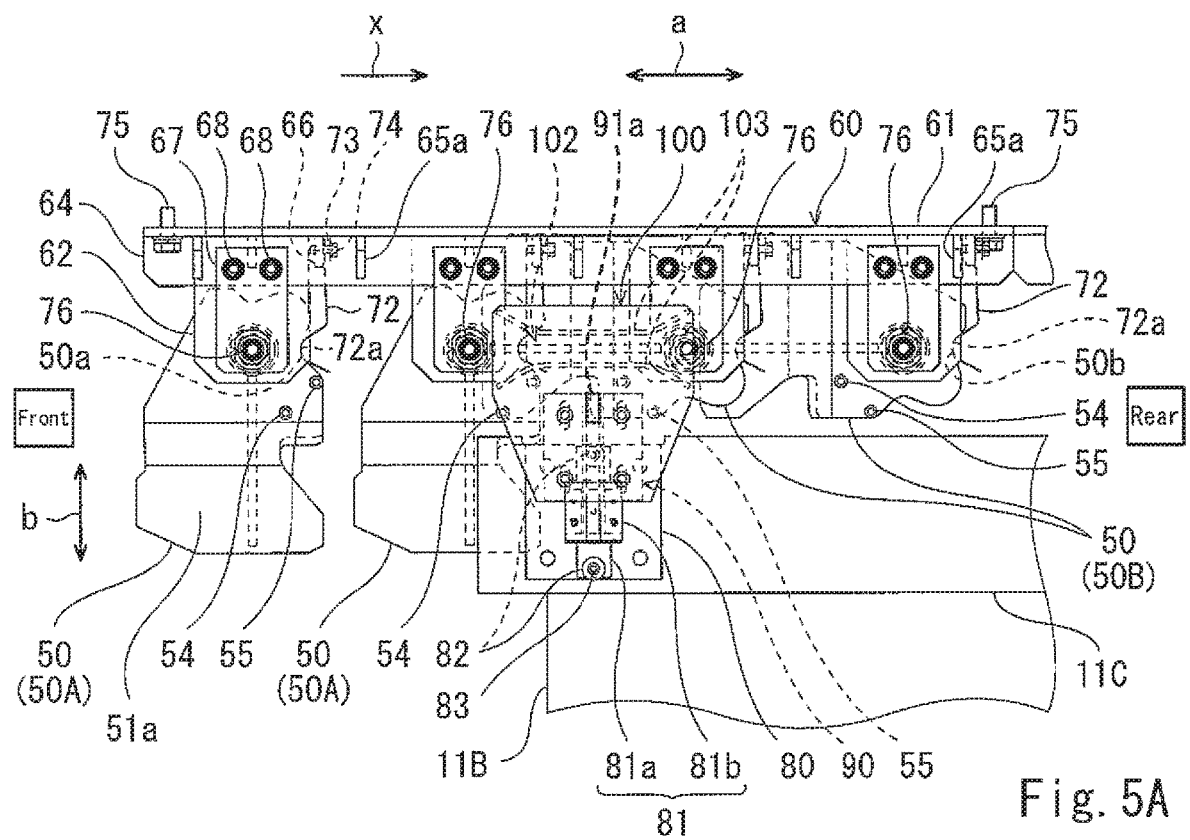
FIG. 5(A) is a plan view showing a portion of the inner region (inner side) of the second tunnel which is in the vicinity of a fixed walkway section protruding to the front from the first tunnel.
Figure 5B:
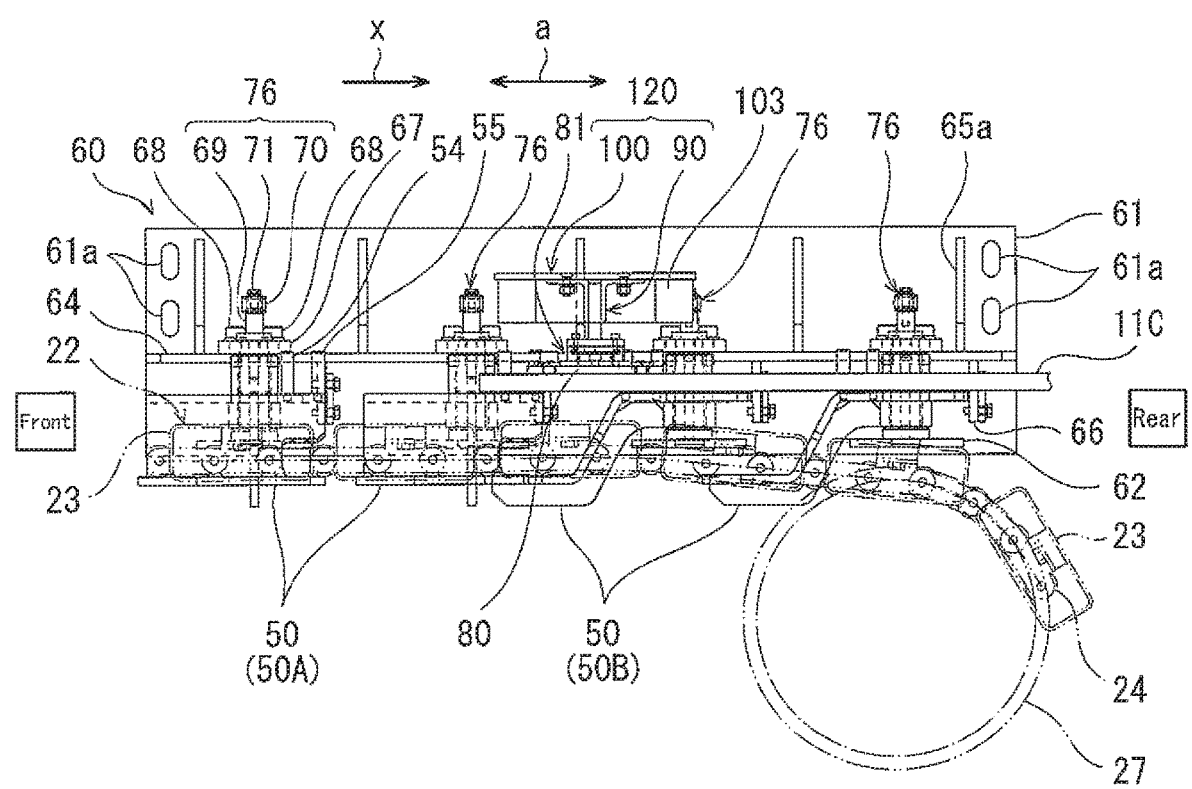
FIG. 5(B) is a view showing the same portion as that of FIG. 5(A), when viewed in a walkway width direction.
Figure 6:
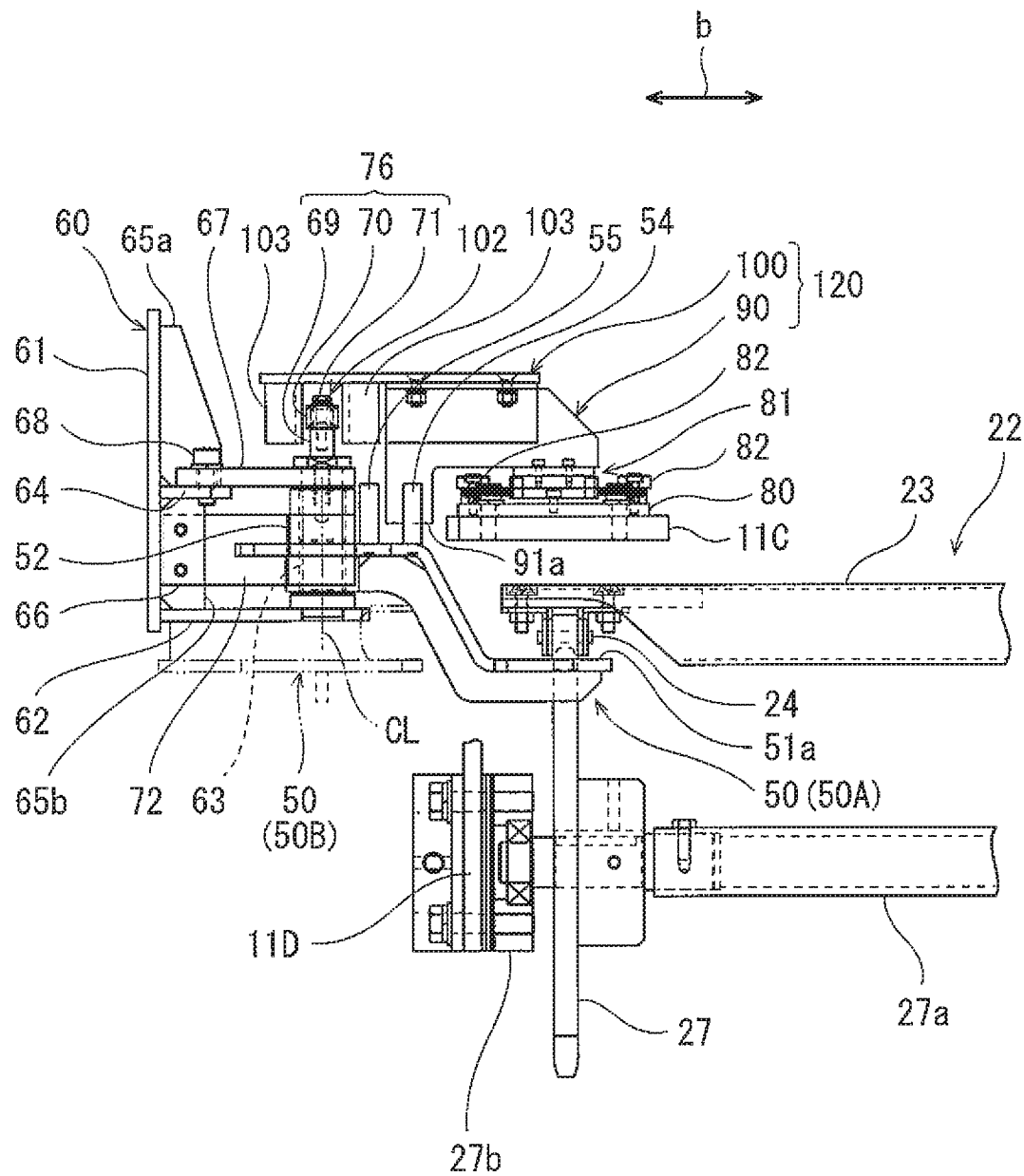
FIG. 6 is a view showing a portion of the movable walkway section of the second tunnel and a portion of a region which is in the vicinity of the movable walkway section of the second tunnel.

FIG. 5(A) is a plan view showing a portion of the inner region (inner side) of the second tunnel 2 which is in the vicinity of the fixed walkway section 11B protruding to the front from the first tunnel 1. FIG. 5(B) is a view showing the same portion as that of FIG. 5(A), when viewed in a walkway width direction. FIG. 6 is a view showing the same portion in a walkway direction (walkway length direction). Although the tunnel section has a laterally symmetric configuration with respect to the fixed walkway section 11B and the movable walkway section 22, FIGS. 5(A), 5(B) and 6 show a portion of the structure on one side.

As shown in FIGS. 5(B) and 6, the floor member 23 is formed by a tubular member with a substantially rectangular cross-section, and the side surfaces and lower surfaces of the both end portions in the walkway width direction are removed, and the chains 24 are mounted on this portion. Each of the chains 24 is constituted by a roller chain and provided with mounting portions used to mount the floor members 23. The mounting portions are fastened to the floor members 23 by bolts and nuts. In FIG. 5(A), the movable walkway section 22 (the floor member 23 and the chain 24) are not shown. In FIGS. 5(B) and 6, the fixed walkway section 11B is not shown.

In the movable walkway section 22, the plurality of floor members 23 are mounted on the pair of endless chains 24 at predetermined pitch and coupled to each other. In the movable walkway section 22, a continuous carpet (not shown) is provided over the outer surfaces of the plurality of floor members 23. The height position (vertical position) of the walkway surfaces, including the thickness of this carpet, is set as the height position of the walkway surfaces of the fixed walkway sections 11A, 11B, 21A, 21B, 31. In the present embodiment, the floor members 23 of the movable walkway section 22 and the carpet are provided over the entire periphery of the endless chains 24. However, this is exemplary. It is sufficient that the floor members 23 and the carpet are provided in a range which is more than a maximum range R2 in which the movable walkway section 22 can become the walkway surface. The same applies to the movable walkway section 32 of the third tunnel 3. The floor members 23 of the movable walkway section 32 and the carpet are provided in a range which is more than a maximum range R3 in which the movable walkway section 32 can become the walkway surface.

To support the movable walkway section 22 at the walkway position H1, a plurality of rotary members 50 are provided along the lengthwise direction (front-rear direction a) of the second tunnel 2 on both sides in the width direction of the movable walkway section 22, in a range R2 inside the second tunnel 2. Each of the rotary members 50 is rotatable around a rotation axis line CL (FIG. 6) extending in the vertical direction. Each of the rotary members 50 is rotated in forward and reverse directions, between a first rotation position at which the rotary member 50 supports the movable walkway section 22 at the walkway position H1 and a second rotation position at which the rotary member 50 does not support the movable walkway section 22.

In FIGS. 5(A) and 5(B), two rotary members 50 on a left side are at the first rotation position. At this time, the rotary members 50 are in a support state in which the rotary members 50 support the upper chain 24 located between the first sprocket 25 and the third sprocket 27 from the underside so that the walkway surface of the movable walkway section 22 is maintained at the predetermined height position. In FIGS. 5(A) and 5(B), two rotary members 50 on a right side are at a second rotation position. At this time, the rotary members 50 are in a non-support state in which the rotary members 50 are away from the end portion of the movable walkway section 22 and are located outward of the movable walkway section 22 in the width direction. In this state, the rotary members 50 do not support the chain 24.

Next, the rotary members 50 and mounting structures for the rotary members 50 will be described in detail.

Inside the second tunnel 2, brackets 60 are fastened to a region which is near the lower end of the panel 6 (see FIG. 2) on each of both sides in the walkway width direction, to support the rotary members 50. Each of the brackets 60 is fastened to the panel 6 by use of, for example, four bolts 75. Mounting holes 61a are formed in each of the both end portions of the bracket 60 to allow the bolts 75 to be inserted thereinto.

The brackets 60 and the rotary members 50 are provided continuously in the range R2 between the front end of the fixed walkway section 11B of the first tunnel 1 and the rear end of the fixed walkway section 21A of the second tunnel 2, for example, in a state in which the tunnel section TN is most extended to its maximum length as shown in FIG. 1(B), namely, a maximum range R2 in which the movable walkway section 22 can become the walkway surface. In the case of the third tunnel 3, the brackets 60 and the rotary members 50 are provided continuously in the range R3 of FIG. 1(B). In the present example, one bracket 60 corresponds to four rotary members 50. In the lengthwise direction, a plurality of brackets 60 are arranged. Note that the brackets 60 may have an integrated structure or may be comprised of a plurality of separate members, in the range R2, R3, as in the case of the present example.

FIGS. 7(A), 7(B), and 7(C) are a plan view, a front view, and a side view of the bracket 60.

In this bracket 60, four horizontal plates 62 corresponding to four rotary members 50, respectively, are secured to the lower portion of a vertical plate 61 with a rectangular shape, by welding or the like. Shafts 63 are secured to predetermined locations of the horizontal plates 62, respectively, to mount the rotary members 50.

In the bracket 60, an elongated plate 64 is placed horizontally along the center portion of the vertical plate 61 and secured thereto, by welding or the like. The elongated plate 64 is formed with four pair of holes 64a corresponding to the four rotary members 50, respectively. The elongated plate 64 and the vertical plate 61 are secured to each other by reinforcement plates 65a. Reinforcement plates 65b are provided at the lower side of the elongated plate 64, and secured to the elongated plate 64, the horizontal plates 62 and the vertical plate 61, by welding or the like.

Four leaf (plate) spring mounting plates 66 are secured to predetermined locations of the bracket 60 by welding or the like. Each of the leaf spring mounting plates 66 is formed with two screw holes 66a. As shown in FIG. 5(A), a leaf spring (positioning and retaining member) 72 is sandwiched between each of the leaf spring mounting plates 66 and a press plate 73, and two bolts 74 are threadingly engaged with the two screw holes 66a. In this way, the leaf spring 72 is mounted. Each of the leaf spring 72 and the press plate 73 is provided with two holes into which the two bolts 74 are inserted. The leaf spring 72 is formed by bending a leaf (plate) spring with a rectangular shape. The leaf spring 72 has a convex portion 72a protruding to the rotary member 50. The leaf spring 72 is not shown in FIG. 5(B).

Figure 8A:
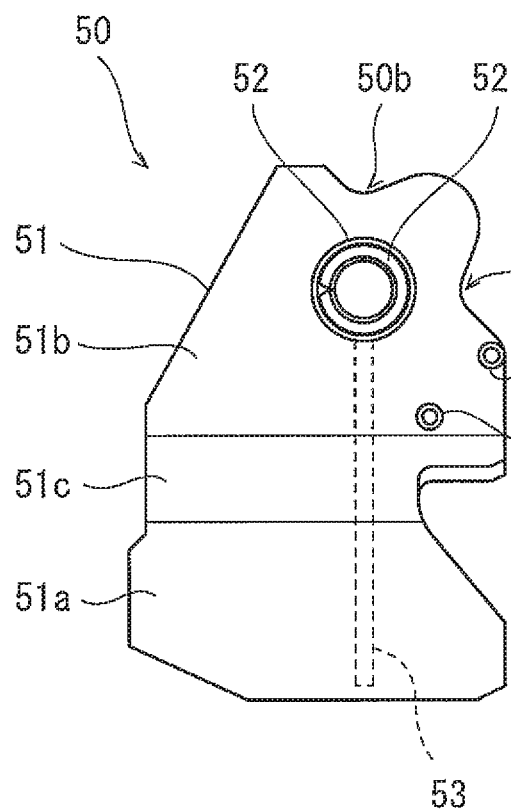
FIGS. 8(A), 8(B), and 8(C) are a plan view of a rotary member, a side view of the rotary member when viewed from one side, and a side view of the rotary member when viewed from the other side (opposite side).
Figure 8C:
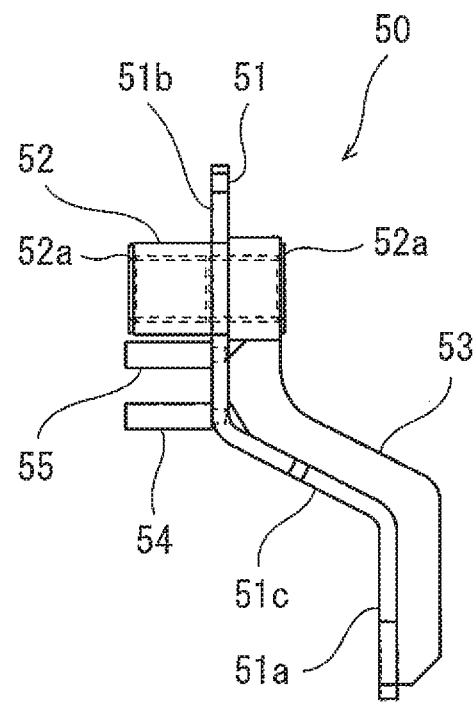
Figure 8B:
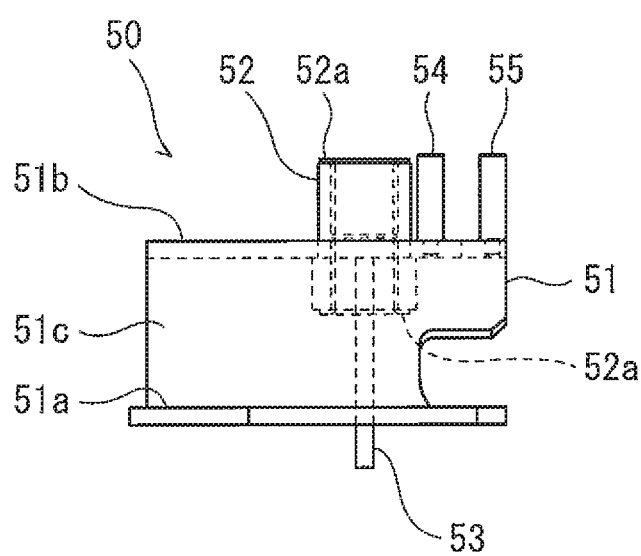

FIGS. 8(A), 8(B), and 8(C) are a plan view of the rotary member 50, a side view of the rotary member 50 when viewed from one side, and a side view of the rotary member 50 when viewed from the other side (opposite side).

The rotary member 50 includes a bent plate 51, a bearing 52 on which two flange bushes 52a are mounted from an upper side and a lower side, a reinforcement member 53, and first and second contacted rods 54, 55. The bearing 52 and the first and second contacted rods 54, 55 are secured to the bent plate 51, by welding or the like. The reinforcement member 53 is secured to the bearing 52 and the bent plate 51 by welding or the like.

The bent plate 51 is formed by bending a metal plate processed with a predetermined shape. The bent plate 51 includes a support portion 51a placed horizontally and supporting the end portion of the movable walkway section 22, a mounting portion 51b which is placed horizontally and to which the bearing 52, and the first and second contacted rods 54, 55 are secured, and an inclined portion 51c connecting the support portion 51a to the mounting portion 51b. The mounting portion 51b has two engaged depressed portions (first and second engaged portions) 50a, 50b which are engageable with the convex portion 72a of the leaf spring 72.

As shown in FIG. 6, the rotary member 50 is mounted on the shaft 63 by inserting the shaft 63 of the bracket 60 into the bearing 52. An upper plate 67 formed with a hole into which the shaft 63 is insertable is fastened to the elongated plate 64 of the bracket 60, by two bolts 68 in a state in which the upper plate 67 presses the upper end of the bearing 52.

A roller shaft 69 is mounted on the upper end of the shaft 63. A roller follower 70 is rotatably mounted on the roller shaft 69 by use of a roller follower pin 71. In this example, a guide section 76 is constituted by the roller shaft 69, the roller follower 70, and the roller follower pin 71. However, the configuration of the guide section 76 is not limited to the above. For example, the guide section 76 may be constituted by a shaft or rod member such as the roller shaft 69 extending along the rotation axis line CL of the rotary member 50, and a roller such as a guide roller mounted on the shaft or rod member. Thus, the guide section 76 may be suitably modified.

In the present example, a center line of the shaft 63 is the rotation axis line CL of the rotary member 50, and the guide section 76 is provided on this rotation axis line CL.

On the mounting plate 11C, a base plate 80, a linear motion guide mechanism 81, a contact member 90, and a passage channel member 100, are provided. The mounting plate 11C protrudes to the front from the front end of the tubular member 1a of the first tunnel 1.

The base plate 80 with a rectangular shape is mounted on the mounting plate 11C by, for example, four bolts. The both ends of a rail 81a of the linear motion guide mechanism 81 are fastened to the base plate 80 together with stoppers 82 by bolts 83. The contact member 90 is fastened onto a block 81b of the linear motion guide mechanism 81 by a bolt. The passage channel member 100 is fastened onto the contact member 90 by a bolt and a nut. The contact member 90 and the passage channel member 100 constitute a rotation operation member 120. The linear motion guide mechanism 81 is a linear motion guide device. The block 81b is slidable on the rail 81a between the stoppers 82 on both sides. The linear motion guide mechanism 81 allows the rotation operation member 120 including the contact portion 91a and the passage channel 102 to be slidable in a predetermined range (between the stoppers 82 on both sides) in the width direction of the movable walkway section 22, with respect to the mounting plate 11C and the base plate 80, namely, the front end of the first tunnel 1.

FIGS. 9(A), 9(B), and 9(C) are a plan view of the contact member 90, a side view of the contact member 90 when viewed from one side, and a side view of the contact member 90 when viewed from the other side (opposite side).

This contact member 90 includes a body 91 with a predetermined shape, and a mounting portion 92 with a rectangular shape secured to a predetermined location of the body 91, by welding, or the like, and two mounting support portions 93 with a L-shaped cross-section secured to predetermined locations of the body 91, by welding or the like. The mounting portion 92 is mounted on the block 81b of the linear motion guide mechanism 81 by four bolts. The mounting portion 92 is formed with four holes 92a into which four bolts are insertable. The mounting support portions 93 are formed with four holes 93a into which bolts are insertable. The passage channel member 100 is mounted on the mounting support portions 93 by four bolts and four nuts. A downwardly extending portion of the body 91 is the contact portion 91a. This contact portion 91a contacts the first contacted rod 54 or the second contacted rod 55 of the rotary member 50, in a case where the tunnel section TN is extended and retracted.

Figure 10C:
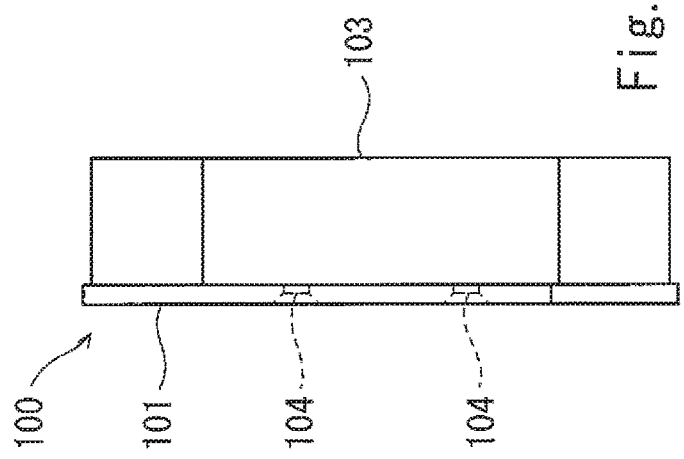
FIGS. 10(A), 10(B), and 10(C) are a plan view of a passage channel member, a side view of the passage channel member when viewed from one side, and a side view of the passage channel member when viewed from the other side (opposite side).
Figure 10A:
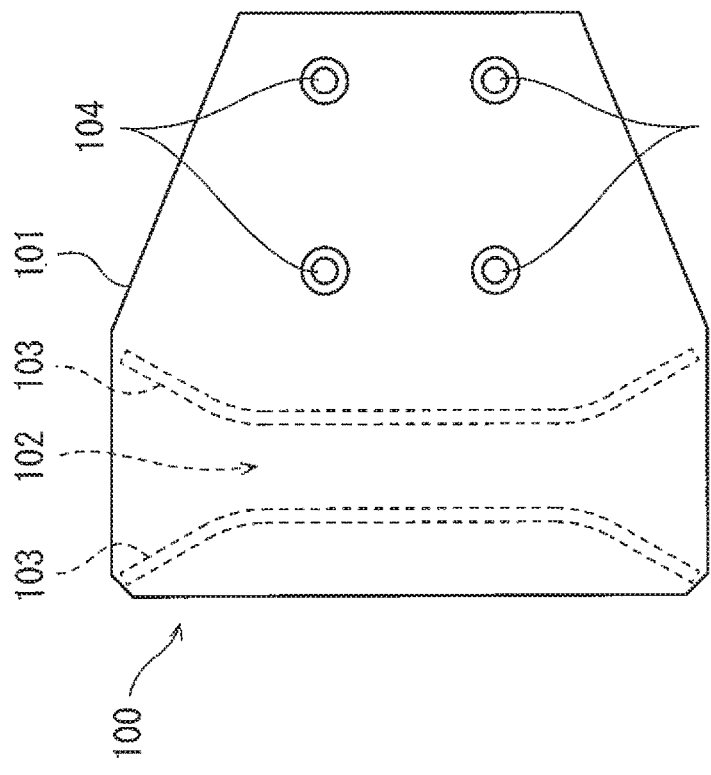
Figure 10B:
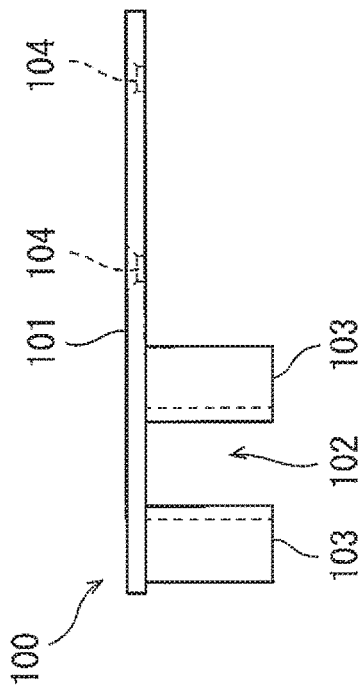

FIGS. 10(A), 10(B), and 10(C) are a plan view of the passage channel member 100, a side view of the passage channel member 100 when viewed from one side, and a side view of the passage channel member 100 when viewed from the other side (opposite side).

The passage channel member 100 includes a pair of channel forming plates 103 forming the passage channel 102 which are secured to the lower surface of a region on one side of a flat plate 101 with a predetermined shape, by welding or the like. The pair of channel forming plates 103 are formed so that the both end portions (entrance and exit) of the passage channel 102 are wider than the remaining portion. Four bolt insertion holes 104 are formed in a region on the other side of the flat plate 101. These four bolt insertion holes 104 are aligned with four holes 93a, respectively, of the contact member 90. Then, the passage channel member 100 is fastened onto the mounting support portions 93 of the contact member 90 by bolts and nuts. In this way, the rotation operation member 120 is constructed.

The fixed walkway section 11B, the third sprockets 27, and the like are mounted at the front end of the first tunnel 1. Also, the mounting plate 11C is mounted at the front end of the first tunnel 1. The linear motion guide mechanism 81, the rotation operation member 120, and the like are mounted at the tip end portion of the mounting plate 11C. In the rotation operation member 120 in which the contact member 90 and the passage channel member 100 are fastened to each other, the position of the passage channel 102 with respect to the contact portion 91a is fixed, and thus a positional relation between the contact portion 91a and the passage channel 102 is unvaried. The passage channel 102 extends in the lengthwise (longitudinal) direction (front-rear direction a) of the first tunnel 1.

In a case where the tunnel section TN is extended and retracted, the second tunnel 2 moves in the front-rear direction a with respect to the first tunnel 1. At this time, the contact portion 91a of the rotation operation member 120 contacts the first or second contacted rod 54, 55, and thus the rotary member 50 is rotated. The rotary member 50 is rotated while the guide section 76 provided on the rotation axis line CL of the rotary member 50 is moving within the passage channel 102 of the rotation operation member 120.

For example, as shown in FIGS. 5(A) and 5(B), in a case where the second tunnel 2 moves in the front-rear direction a with respect to the first tunnel 1, the rotary member 50 is rotated in forward and reverse directions, between the first rotation position at which the support portion 51a is in the support state and supports the chain 24 at the end portion of the movable walkway section 22 in the width direction, and the second rotation position at which the support portion 51a is in the non-support state, is away from the movable walkway section 22, and does not support the chain 24. In the example of FIGS. 5(A) and 5(B), the rotary members 50 indicated by a reference symbol 50A are at the first rotation position, while the rotary members 50 indicated by a reference symbol 50B are at the second rotation position.

For example, in a case where the tunnel section TN is retracted, the second tunnel 2 is moved in an arrow x direction with respect to the first tunnel 1. At this time, the chains 24 are guided by the third sprockets 27 and the floor members 23 are moved in turn to the underside of the fixed walkway section 11B so that the length in the front-rear direction of the walkway surface of the movable walkway section 22 is reduced.

At this time, the plurality of rotary members 50 are rotated in turn so that they change from the first rotation position to the second rotation position, starting from one which is closer to the fixed walkway section 11B, and cease to support a portion of the chain 24 which is secured onto the floor members 23 moving to a lower side, from the walkway position H1 to the non-walkway position H2. Specifically, when the second tunnel 2 is moved in the arrow x direction, from the state shown in FIGS. 5(A) and 5(B), the contact portion 91a of the rotation operation member 120 pushes the first contacted rod 54 of the rotary member 50 at the first rotation position which is in front of the contact portion 91a, in a direction opposite to the x direction, to rotate the rotary member 50. Thus, the rotary member 50 is rotated so that the support portion 51a is moved away from the end portion of the movable walkway section 22 in the width direction, and is placed outward of the movable walkway section 22 in the width direction, and the convex portion 72a of the leaf spring 72 of this rotary member 50 is engaged with the engaged depressed portion 50b. At this time, the convex portion 72a of the leaf spring 72 is pushed against the engaged depressed portion 50b. In this way, the rotary member 50 is positioned and retained at the second rotation position.

In contrast, in a case where the tunnel section N is extended, the second tunnel 2 is moved in a direction opposite to the arrow x direction, with respect to the first tunnel 1. At this time, the chains 24 are guided by the third sprockets 27 and the floor members 23 are moved to an upper side in turn from the underside of the fixed walkway section 11B so that the length in the front-rear direction of the walkway surface of the movable walkway section 22 is increased.

At this time, the plurality of rotary members 50 are rotated in turn so that they change from the second rotation position to the first rotation position, to support a portion of the chain 24 which is secured to the floor members 23 being moved up (raised) from the non-walkway position H2 to the walkway position H1. Specifically, when the second tunnel 2 is moved in a direction opposite to the arrow x direction, from the state shown in FIGS. 5(A) and 5(B), the contact portion 91a of the rotation operation member 120 pushes in the x direction, the second contacted rod 55 of the rotary member 50 at the second rotation position which is rearward of the contact portion 91a, to rotate the rotary member 50. Thus, the rotary member 50 is rotated so that the support portion 51a is moved from a location that is outward of the movable walkway section 22 in the width direction to a location where the support portion 51a supports the end portion of the movable walkway section 22 in the width direction, and the convex portion 72a of the leaf spring 72 corresponding to this rotary member 50 is engaged with the engaged depressed portion 50a. At this time, the convex portion 72a of the leaf spring 72 is pressed against the engaged depressed portion 50a. Thus, the rotary member 50 is positioned and retained at the first rotation position.

As described above, in a case where the rotary member 50 is rotated, the guide section 76 provided on the rotation axis line CL of this rotary member 50 moves (passes) through the passage channel 102 of the rotation operation member 120. The rotation operation member 120 includes the contact portion 91a whose position with respect to the passage channel 102 is fixed. Since the rotation operation member 120 is mounted on the linear motion guide mechanism 81, the rotation operation member 120 is slidable in a predetermined range (e.g., ±10 mm) in the walkway width direction b. Since the guide section 76 moves (passes) through the passage channel 102 in a case where the tunnel section TN is extended and retracted, the contact portion 91a can accurately contact the first contacted rod 54 or the second contacted rod 55 and the rotary member 50 can be properly rotated according to the extension/retraction of the tunnel section TN, while absorbing a position error in the walkway width direction b of the contact portion 91a with respect to the rotary member 50 (in particular, the first contacted rod 54 or the second contacted rod 55), which occurs due to the fitting clearance formed between the first tunnel 1 and the second tunnel 2. Therefore, even when a little change occurs in the fitting clearance in the walkway width direction b between the first tunnel 1 and the second tunnel 2, in a case where the tunnel section TN is extended and retracted, the rotary member 50 can smoothly support the movable walkway section 22 and smoothly cease to support the movable walkway section 22.

In the present embodiment, as shown in FIGS. 5(A) and 5(B), when at least one of adjacent rotary members 50 is in the non-support state (second rotation position) in which it is away from the movable walkway section 22, the adjacent rotary members 50 partially overlap with each other when viewed in the vertical direction. Since the adjacent rotary members 50 partially overlap with each other, the arrangement pitch of the rotary members 50 can be reduced, and the movable walkway section 22 at the walkway position H1 can be stably supported. Further, in the present example, the shape and dimension of the rotary member 50 are considered so that the support portion 51a of the rotary member 50 in the support state (first rotation position) has a horizontal surface extending in the walkway length direction (direction a). This makes it possible to increase a support area of the rotary member 50 at the end portion of the movable walkway section 22 in the width direction, and to stably support the movable walkway section 22 at the walkway position H1.

Figure 12A:
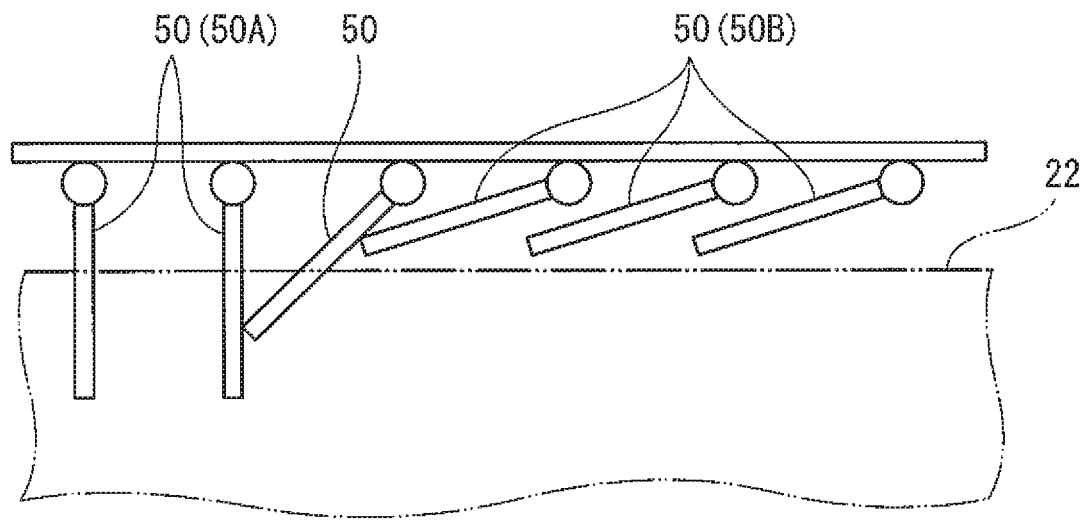
FIG. 12(A) is a conceptual top plan view showing a configuration in which adjacent rotary members partially overlap with each other, when viewed in a walkway width direction.
Figure 12B:
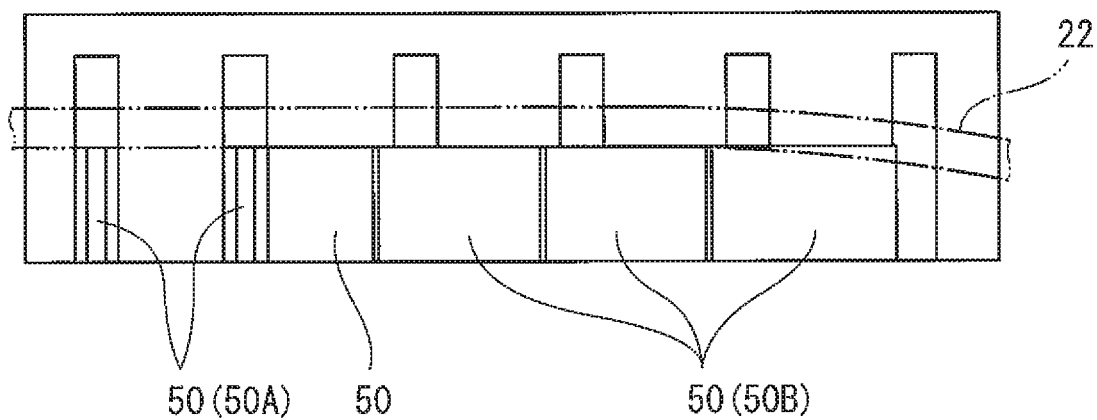
FIG. 12(B) is a conceptual view showing this configuration when viewed in the walkway width direction.

Alternatively, when at least one of adjacent rotary members 50 is in the non-support state (second rotation position) in which it is away from the movable walkway section 22, the adjacent rotary members 50 may partially overlap with each other when viewed in the walkway width direction, to reduce the arrangement pitch of the rotary members 50. FIGS. 12(A) and 12(B) show conceptual views of this configuration. FIG. 12(A) is a conceptual top plan view showing a configuration in which adjacent rotary members partially overlap with each other, when viewed in the walkway width direction. FIG. 12(B) is a conceptual view showing this configuration when viewed in the walkway width direction. In the example of FIGS. 12(A) and 12(B), the third rotary member 50 from the left is at an intermediate position between the first rotation position and the second rotation position. Note that FIGS. 12(A) and 12(B) conceptually show that the adjacent rotary members 50 partially overlap with each other and do not precisely show other portions. 12(A) and 12(B) do not show, for example, the mechanism for rotating the rotary member 50. The shape or the like of the rotary member 50 can be suitably changed.

In the present embodiment, the leaf spring 72 corresponding to each rotary member 50 is provided, and the engaged depressed portion 50a which is engageable with the leaf spring 72 in a state in which the rotary member 50 is at the first rotation position, and the engaged depressed portion 50b which is engageable with the leaf spring 72 in a state in which the rotary member 50 is at the second rotation position, are provided at the periphery of the rotary member 50. This makes it possible to easily position and retain the rotary member 50 at the first rotation position and the second rotation position. Since a friction is generated between the rotary member 50 and the leaf spring 72 during the rotation of the rotary member 50, abrasion of the rotary member 50 and the leaf spring 72 can be reduced.

In the present embodiment, the movable walkway section 22 includes the plurality of floor members 23 which are coupled to each other by the endless chains 24, and the chains 24 are supported by the rotatable first to third sprockets 25 to 27 so that the chains 24 are movable along the circular path. The movable walkway section 22 is rotated and thus the floor members 23 lying at the underside of the walkway section are exposed as the walkway surface. Maintenance for the floor members 23, such as replacement or repair of the floor members 23 can be easily carried out. Alternatively, the chains 24 may be replaced by belt members or wires, and the first to third sprockets 25 to 27 may be replaced by pulleys.

The movable walkway section 22 may be configured to be incapable of rotation. Although the plurality of floor members 23 are coupled to each other by the endless chains 24, the adjacent floor members 23 may be coupled to each other by coupling members such as hinges and the rotary members 50 at the first rotation position may support the end portions of the floor members 23. The floor members 23 may have a flat plate shape. Thus, modifications can be made. Hereinafter, several modifications will be described with reference to the drawings.

[Modifications]

Figure 11A:
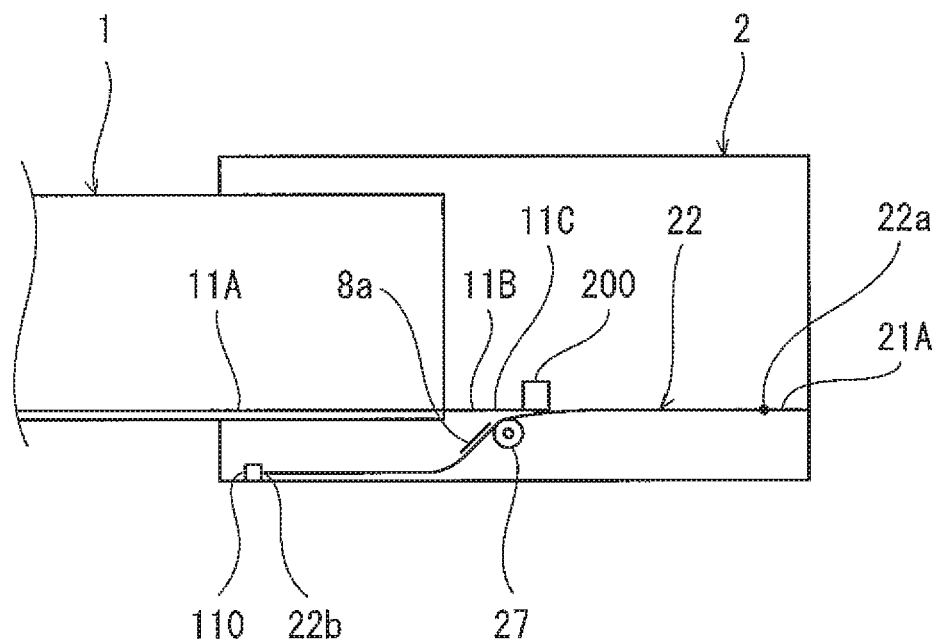
FIG. 11(A) is a schematic view showing a tunnel section of a passenger boarding bridge according to Modified Example 1.
Figure 11B:
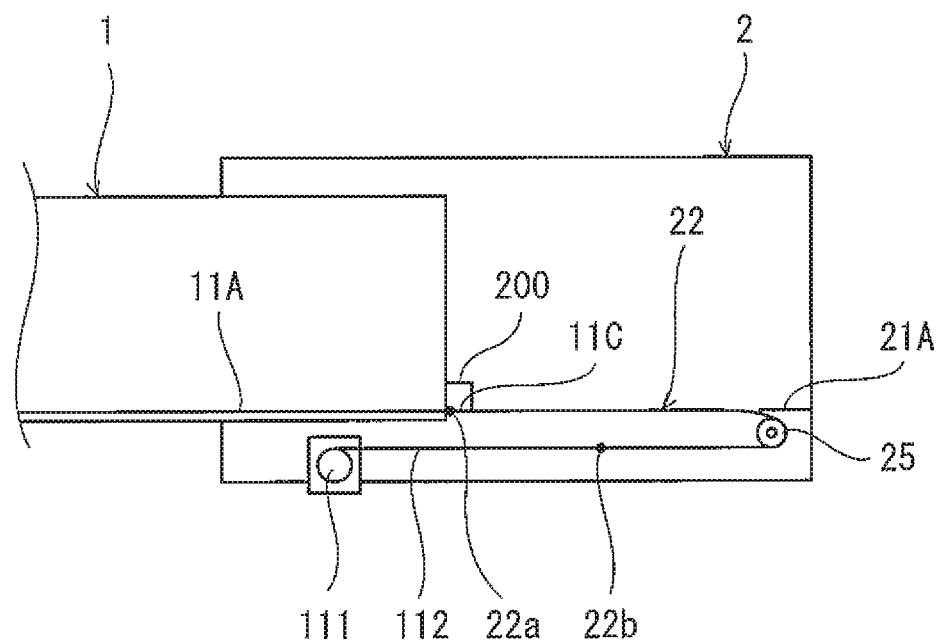
FIG. 11(B) is a schematic view showing a tunnel section of a passenger boarding bridge according to Modified Example 2.

FIG. 11(A) is a schematic view showing a tunnel section of a passenger boarding bridge according to Modified Example 1. FIG. 11(B) is a schematic view showing a tunnel section of a passenger boarding bridge according to Modified Example 2. In FIGS. 11(A) and 11(B), reference symbol 200 indicates a block comprised of the base plate 80, the linear motion guide mechanism 81, and the rotation operation member 120 which are provided on the mounting plate 11C. In FIGS. 11(A) and 11(B), the rotary member 50 and the associated members are not shown. The third tunnel 3 is not shown.

In Modified Example 1 shown in FIG. 11(A), a first end (one end) 22a of the movable walkway section 22 of the second tunnel 2 is connected to the fixed walkway section 21A which is in front of the second tunnel 2, and a second end (the other end) 22b of the movable walkway section 22 is secured to the mounting portion 110 provided at the bottom portion of the second tunnel 2. The first end 22a and the second end 22b are, for example, the first end and second end of the chain 24. The other constituents are the same as those of the above-described example. Between the second end 22b of the movable walkway section 22 and the mounting portion 110, a spring member or the like which applies a tension to the movable walkway section 22 may be provided. Further, the fixed walkway section 21A may be omitted and the first end 22a of the movable walkway section 22 may be connected to the front end of the second tunnel 2.

In Modified Example 2 shown in FIG. 11(B), the first end (one end) 22a of the movable walkway section 22 of the second tunnel 2 is connected to the front end of the fixed walkway section 11A of the first tunnel 1, and the second end (the other end) 22b of the movable walkway section 22 is connected to a wire 112. The first end 22a and the second end 22b are, for example, the first end and the second end of the chain 24. In a case where the tunnel section is retracted, the wire 112 is wound by a winding unit 111. In a case where the tunnel section is extended, the wire 112 is drawn out from the winding unit 111. Further, the fixed walkway section 11B may be provided at the front end of the first tunnel 1 as shown in FIG. 11(A) and the first end 22a of the movable walkway section 22 may be connected to the front end of the fixed walkway section 11B.

In the above-described example of the present embodiment, the tunnel section TN includes the first to third tunnels 1 to 3, and the first tunnel 1 is the inner tunnel and the second tunnel 2 is the outer tunnel, in the case of, for example, the first and second tunnels 1, 2 which are adjacent to each other. In this case, the movable walkway section 22 of the second tunnel 2 corresponds to the walkway section of the outer tunnel. Also, the second tunnel 2 is the inner tunnel and the third tunnel 3 is the outer tunnel, in the case of, for example, the second and third tunnels 2, 3 which are adjacent to each other. In this case, the movable walkway section 32 of the third tunnel 3 corresponds to the walkway section of the outer tunnel. Although in the present embodiment, the tunnel section TN includes the three tunnels, the tunnel section TN may include two or more tunnels (a plurality of tunnels).

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention is useful as a passenger boarding bridge or the like which has a stepless structure and allows a walkway section of an outer tunnel to be stably supported.

REFERENCE CHARACTERS LIST

TN tunnel section
CL rotation axis line
1~3 tunnel
22, 32 movable walkway section
50 rotary member
50a, 50b engaged depressed (recessed) portion
72 leaf spring
76 guide section
91a contact portion
102 passage channel
120 rotation operation member

The invention claimed is:

1. A passenger boarding bridge including a tunnel section including a plurality of tunnels which are telescopically fitted to each other and are movable relative to each other in a lengthwise direction so that the tunnel section is extendable and retractable, the passenger boarding bridge comprising:
  a walkway section which is provided at an outer tunnel of adjacent tunnels, and is movable between a walkway position set at a predetermined height position and a non-walkway position located under the walkway position; and
  a plurality of rotary members arranged along the lengthwise direction of the outer tunnel, each of the plurality of rotary members being rotatable around a rotation axis line extending in a vertical direction, and each of the plurality of rotary members being configured to be rotated between a first rotation position at which the rotary member supports an end portion of the walkway section in a width direction so that the walkway section is at the walkway position and a second rotation position at which the rotary member is away from the end portion of the walkway section in the width direction and does not support the end portion of the walkway section in the width direction,
  wherein in a case where at least one of adjacent rotary members of the plurality of rotary members is at the second rotation position, the adjacent rotary members partially overlap with each other when viewed in the width direction of the walkway section or in the vertical direction.

2. The passenger boarding bridge according to claim 1, further comprising:
  a positioning and retaining member which is engageable with a first engaged portion provided at each of the plurality of rotary members to position and retain the rotary member at the first rotation position, the positioning and retaining member being engageable with a second engaged portion provided at each of the plurality of rotary members to position and retain the rotary member at the second rotation position.

3. The passenger boarding bridge according to claim 1, further comprising:
  a guide section provided on the rotation axis line to correspond to each of the plurality of rotary members; and
  a rotation operation member protruding from a front end of an inner tunnel of the adjacent tunnels, the rotation operation member including:
    a contact portion which contacts the plurality of rotary members in turn to rotate the rotary members in a case where the tunnel section is extended and retracted, and
    a passage channel extending in the lengthwise direction of the inner tunnel, the guide section being configured to move through the passage channel when each of the plurality of rotary members is rotated,
  wherein the rotation operation member is slidable within a predetermined range in a width direction of the walkway section, with respect to the inner tunnel.

4. The passenger boarding bridge according to claim 1,
  wherein in a case where the tunnel section is retracted, the walkway section at the walkway position is moved to an underside of the inner tunnel, and is placed at the non-walkway position, and the rotary member corresponding to the end portion of the walkway section in the width direction is rotated from the first rotation position to the second rotation position when the walkway section is changed from the walkway position to the non-walkway position, and
  wherein in a case where the tunnel section is extended, the walkway section at the non-walkway position is moved up from the underside of the inner tunnel, and is placed at the walkway position, and the rotary member corresponding to the end portion of the walkway section in the width direction is rotated from the second rotation position to the first rotation position when the walkway section is changed from the non-walkway position to the walkway position.

5. A passenger boarding bridge including a tunnel section including a plurality of tunnels which are telescopically fitted to each other and are movable relative to each other in a lengthwise direction so that the tunnel section is extendable and retractable, the passenger boarding bridge comprising:
  a walkway section which is provided at an outer tunnel of adjacent tunnels, and is movable between a walkway position set at a predetermined height position and a non-walkway position located under the walkway position;
  a plurality of rotary members arranged along the lengthwise direction of the outer tunnel, each of the plurality of rotary members being rotatable around a rotation axis line extending in a vertical direction, and each of the plurality of rotary members being configured to be rotated between a first rotation position at which the rotary member supports an end portion of the walkway section in a width direction so that the walkway section is at the walkway position and a second rotation position at which the rotary member is away from the end portion of the walkway section in the width direction and does not support the end portion of the walkway section in the width direction;
  a guide section provided on the rotation axis line to correspond to each of the plurality of rotary members; and
  a rotation operation member protruding from a front end of an inner tunnel of the adjacent tunnels, the rotation operation member including:

a contact portion which contacts the plurality of rotary members in turn to rotate the rotary members in a case where the tunnel section is extended and retracted, and a passage channel extending in the lengthwise direction of the inner tunnel, the guide section being configured to move through the passage channel when each of the plurality of rotary members is rotated, wherein the rotation operation member is slidable within a predetermined range in a width direction of the walkway surface, with respect to the inner tunnel.

* * * * *